United States Patent
Choi (10) Patent No.: US 7,369,131 B2
(45) Date of Patent: May 6, 2008

(54) MULTI-DISPLAY SYSTEM AND METHOD THEREOF

(75) Inventor: Sung-kyu Choi, Gwangmyung (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 428 days.

(21) Appl. No.: 10/272,016

(22) Filed: Oct. 17, 2002

(65) Prior Publication Data

US 2003/0076278 A1    Apr. 24, 2003

(30) Foreign Application Priority Data

Oct. 19, 2001   (KR)   .............................. 2001-64545

(51) Int. Cl.
  *G06F 15/16*   (2006.01)
  *G06F 13/14*   (2006.01)
  *G06F 13/00*   (2006.01)
(52) U.S. Cl. .................. 345/502; 345/520; 345/536
(58) Field of Classification Search ................. 345/1.1, 345/3.3, 555, 89, 204, 3.1, 596, 690, 98, 345/540, 660, 502, 611, 629, 807, 443, 3.2, 345/280, 694, 581, 698, 535, 547, 603, 501, 345/505, 506, 545, 530, 531, 536, 600, 520; 348/234; 711/173, 157, 5, 137; 600/431; 315/366; 710/56
See application file for complete search history.

(56) References Cited

U.S. PATENT DOCUMENTS

| | | | |
|---|---|---|---|
| 5,237,686 A | * | 8/1993 | Asano et al. ............... 718/105 |
| 5,363,500 A | * | 11/1994 | Takeda ........................ 345/535 |
| 5,583,568 A | * | 12/1996 | Suga et al. .................. 348/234 |
| 5,754,170 A | | 5/1998 | Ranganathan |
| 5,764,201 A | * | 6/1998 | Ranganathan ............... 345/3.3 |
| 5,874,928 A | * | 2/1999 | Kou ............................ 345/1.1 |
| 5,941,968 A | * | 8/1999 | Mergard et al. ............ 710/308 |
| 6,154,225 A | * | 11/2000 | Kou et al. ................... 345/519 |
| 6,535,939 B1 | * | 3/2003 | Arimilli et al. ............. 710/116 |

FOREIGN PATENT DOCUMENTS

| | | |
|---|---|---|
| JP | 02-60390 | 2/1990 |
| JP | 05-265419 | 10/1993 |
| JP | 08-115074 | 5/1996 |

* cited by examiner

*Primary Examiner*—Kee M. Tung
*Assistant Examiner*—Joni Hsu
(74) *Attorney, Agent, or Firm*—Staas & Halsey LLP

(57) ABSTRACT

A multi-display system and a method thereof which solves an overloading problem on a memory bus. The multi-display system includes displays which independently display separate images, a main memory which stores input image signals, image signal process units which are disposed corresponding to the displays and process the image signals according to the corresponding displays, a secondary memory which stores the image signals processed by the image signal process units, and a controller which controls the image signal process units to display the image signals stored in the main memory on each of the corresponding displays. The controller controls the image signal process units to display the image signals stored in the secondary memory on some of the displays in response to overloading of the image signals on the memory bus, through which the image signals are retrieved from, where the image signals are displayed on more than two displays. Accordingly, the multi-display system can prevent the overloading of the image signals on the memory bus and has improved processing capabilities.

13 Claims, 4 Drawing Sheets

MULTI-DISPLAY SYSTEM AND METHOD THEREOF

CROSS-REFERENCE TO RELATED APPLICATIONS

This application claims the benefit of Korean Patent Application No. 2001-64545 filed on Oct. 19, 2001, in the Korean Industrial Property Office, the disclosure of which is incorporated herein by reference.

BACKGROUND OF THE INVENTION

1. Field of the Invention

The present invention relates to a multi-display system and a method thereof, and more particularly, to a multi-display system and a method thereof capable of displaying image signals simultaneously through a plurality of cathode ray tubes (CRTs) and a television, a plurality of liquid crystal displays (LCDs), or a plurality of CRTs and a plurality of LCDs.

2. Description of the Related Art

Some graphic controllers can control an image to be displayed on more than two different displays. For example, a personal digital assistant (PDA) can display the image on a liquid crystal display (LCD) and at the same time, on a cathode ray tube (CRT) or a television (TV). The above system is called a multi-display system.

Figure 1:
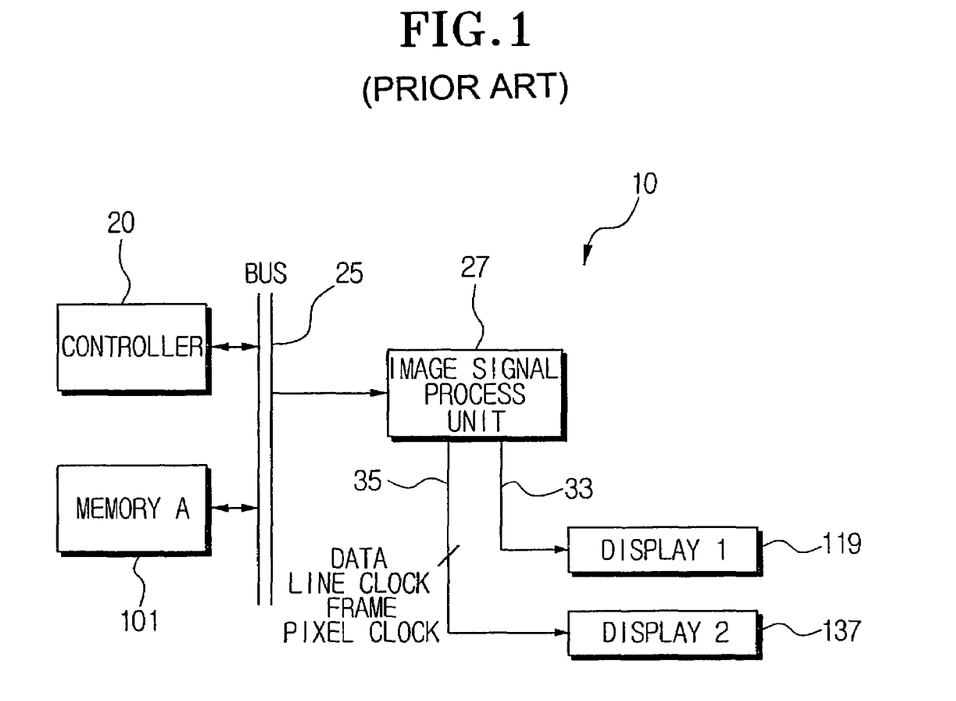
FIG. 1 is a schematic block diagram illustrating a conventional multi-display system.

FIG. 1 shows a schematic block diagram of a conventional multi-display system 10 which displays an image simultaneously on first and second displays 119 and 137. The multi-display system 10 includes a controller 20 which is connected with an image signal process unit 27 through a bus 25. The image process unit 27 is also connected with a memory 101 through the bus 25 so as to retrieve image data. Moreover, the image signal process unit 27 is connected with the first display 119, such as a CRT or a TV, through a bus 33, and with the second display 137, such as a LCD, through a bus 35. The image signal process unit 27 sends signals such as a data signal, a line clock signal, a frame signal, and a pixel clock signal to the buses 33 and 35 so as to operate the CRT or the TV 119, and the LCD 137. The image signal process unit 27 retrieves an image signal from the memory 101 and transmits the image signal to the LCD 137, the CRT, or the TV 119.

Figure 2:
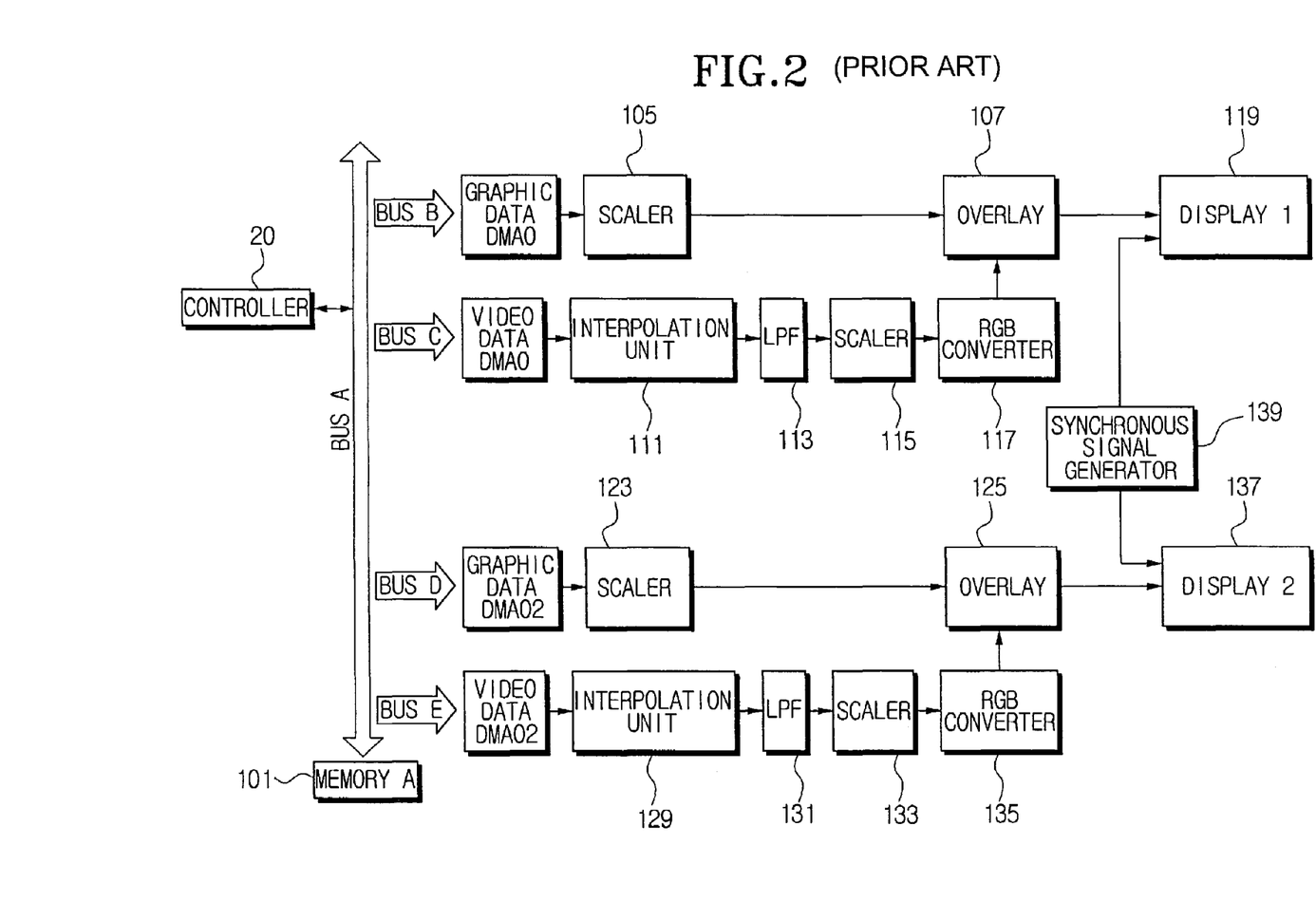
FIG. 2 is a detailed block diagram illustrating an image signal process unit of the multi-display system of FIG. 1.

FIG. 2 shows a detailed block diagram illustrating the operation of the multi-display system 10 of FIG. 1. As shown in FIG. 2, the multi-display system 10 comprises the controller 20, the memory 101, a plurality of scalers 105, 115, 123, and 133, two overlays 107 and 125, two interpolation units 111 and 129, two low pass filters (LPFs) 113 and 131, two RGB converters 117 and 135, a synchronous signal generator 139, the first display 119, and the second display 137.

The controller 20 retrieves graphic data of the image signal to be displayed on the first display 119 from the memory 101 with a direct memory access (DMA) method through a separate route (bus B), and transmits the graphic data to the scaler 105. The scaler 105 transmits the graphic data to the overlay 107 after enlarging or scaling down the graphic data transmitted from the memory 101 by the controller 20.

The controller 20 retrieves video data of the image signal to be displayed on the first display 119 from the memory 101 with the DMA method through a separate route (bus C), and transmits the video data to the interpolation unit 111. The interpolation unit 111 converts a 4:2:0 format of the transmitted data to a 4:2:2 format. Here, the 4:2:0 and 4:2:2 formats are standardization frequency ratios with respect to a luminance signal Y, a digitalized signal Cb of B-Y, a digitalized signal Cr of R-Y. The 4:2:0 format means that the R-Y and the B-Y are standardized to 6.75 MHz by being skipped one line when a Y signal is standardized to 13.5 MHz for every line. The 4:2:2 format means that the R-Y and the B-Y are standardized twice when the Y signal is standardized four times. In Comite Consultatif International de Radio-communition (CCIR) 601, the 4:2:2 standardization is recommended.

The video data interpolated by the interpolation unit 111 is transmitted to the LPF 113. The LPF 113 passes image signals that are below a predetermined frequency, and eliminates the image signals that are above the predetermined frequency. Therefore, a noise element is eliminated by the LPF 113.

The video data passed through the LPF 113 is enlarged or scaled down by the scaler 115. The video data processed by the scaler 115 is transmitted to the RGB converter 117. The RGB converter 117 converts the transmitted video data into RGB data used in a monitor or the CRT. The video data that has been converted into the RGB data is transmitted to the overlay 107.

The overlay 107 receives the graphic data from the scaler 105 and the RGB converted video data from the RGB converter 117, and compounds the two transmitted signals. The overlay 107 transmits the two compounded signals to the first display 119 for displaying.

The controller 20 displays the image signal compounded by the overlay 107 on the first display 119, and at the same time, retrieves the graphic data of the image signal from the memory 101 with the DMA method through a separate route (bus D) in order to display the image signal on the second display 137. Moreover, the controller 20 retrieves the video data of the image signal from the memory 101 with the DMA method through a separate route (bus E) in order to display the image signal on the second display 137. The operation of displaying the graphic data and the video data retrieved from the memory 101 on the second display 137 is the same as the operation of displaying the graphic data and the video data on the first display 119, and the description thereof will be omitted to avoid repetition.

The image signal displayed on the second display 137 is commonly used as the image signal displayed on the first display 119. In FIG. 2, the image signal displayed on the first display 119 and the image signal displayed on the second display 137 are expressed to be stored into the same memory 101. For two image signals to be commonly used, the first display 119 and the second display 137 commonly use an image signal retrieve path (bus A: hereinbelow, referred to as a memory bus).

The second display 137 can simultaneously display an image signal which is the same image signal displayed on the first display 119. In addition, the second display 137 can display an image signal which is different from among the image signals stored in the memory 101 and commonly used. Furthermore, the image signal displayed on the first display 119, which is delayed for a predetermined time, can be displayed on the second display 137. In this case, the synchronous signal generator 139 generates various synch signals required by the displays 119 and 137.

However, as described above, the conventional multi-display system commonly uses the image signal memory bus. Therefore, a load to the memory bus increases where the size of the image signal stored in the memory 101 is large or the frame ratio of each display is great. Consequently, the performance and capability of the entire system deteriorates.

SUMMARY OF THE INVENTION

Accordingly, it is an object of the present invention to provide a multi-display system that reduces a load to a memory bus to have an improved performance, and a method thereof.

Additional objects and advantages of the invention will be set forth in part in the description which follows and, in part, will be obvious from the description, or may be learned by practice of the invention.

To achieve the above and other objects of the present invention, there is provided a multi-display system comprising displays which independently display separate images, a main memory which stores image signals input to the multi-display system, image signal process units which are disposed corresponding to the displays and process the image signals according to the corresponding displays, a memory bus which transmits the image signals to/from the main memory and the image signal process units, a secondary memory which stores the image signals processed by the image signal process units, and a controller which controls the image signal process units to display the image signals stored in the main memory on each of the corresponding displays, wherein the controller controls the image signal process units to display the image signals stored in the secondary memory on some of the displays in response to overloading of the image signals on the memory bus where the image signals are displayed on more than two displays.

According to an aspect of the present invention, each of the image signal process units comprises an interpolation unit which interpolates a standardization frequency ratio of video data of the image signals, a scaler which enlarges and scales down graphic data of the image signals and the interpolated video data, a RGB converter which converts the scale processed video data into RGB data, and an overlay which compounds the scale processed graphic data and the RGB data.

The controller stores the image signals, which are processed by the scaler, the interpolation unit, the RGB converter, and the overlay, into the secondary memory.

In response to the overloading of the image signals on the memory bus, the controller controls the multi-display system so as to retrieve and display the image signals having an optimal size among the image signals stored in the secondary memory. The controller controls the multi-display system to transmit the image signals, retrieved from the secondary memory, to a corresponding one of the image signal process units to perform the rest of the image signal processing operation that has not been performed on the image signals.

Accordingly, there is no overload at the memory bus even when the multi-display system simultaneously indicates an image on the displays. As a result, the performance of the multi-display system is improved.

To achieve the above and other objects of the present invention, there is also provided a method of multi-displaying, the method comprising storing input image signals into a main memory, processing to convert the image signals stored in the main memory into processed image signals corresponding to displays, respectively, storing the processed image signals into a secondary memory, and displaying the processed image signals on each of the displays, and displaying the processed image signals stored in the secondary memory on some of the displays in response to overloading of the image signals on a memory bus, through which the image signals are retrieved from, where the image signals are displayed on more than two displays.

BRIEF DESCRIPTION OF THE DRAWINGS

These and other objects and advantages of the present invention will become apparent and more readily appreciated from the following description of the embodiments, taken in conjunction with the attached drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
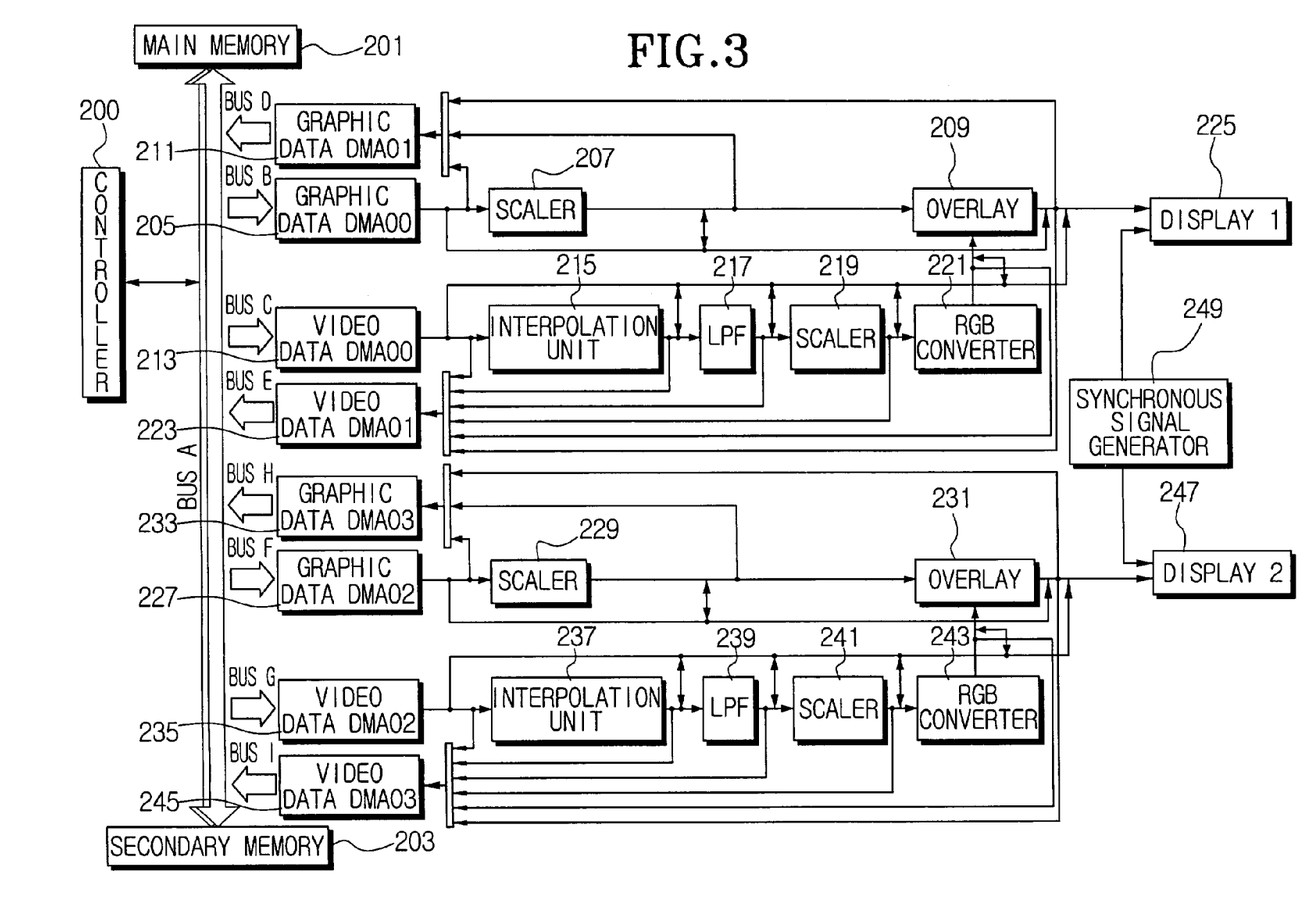
FIG. 3 is a detailed block diagram illustrating a multi-display system and an image signal process unit of the multi-display system according to an embodiment of the present invention.

FIG. 3 shows a block diagram of an image signal process unit of a multi-display system 100 according to an embodiment of the present invention. Hereinbelow, the multi-display system capable of displaying an image simultaneously on two displays will be described. However, it is understood that a multi-display system of the present invention is capable of displaying the image simultaneously on more than two displays.

The multi-display system 100 comprises a controller 200, a main memory 201, a secondary memory 203, a plurality of scalers 207, 219, 229, and 241, two overlays 209 and 231, two interpolation units 215 and 237, two LPFs 217 and 239, two RGB converters 221 and 243, a synchronous signal generator 249, a first display 225, and a second display 247.

The controller 200 retrieves graphic data of an image signal to be displayed on the first display 225 from the main memory 201 with a DMA method through a separate route (bus B) and transmits the graphic data to the scaler 207. The scaler 207 transmits the graphic data transmitted from the main memory 201 after enlarging and scaling down the graphic data by the controller 200 to the overlay 209.

The controller 200 retrieves video data of the image signal to be displayed on the first display 225 from the main memory 201 with the DMA method through a separate route (bus C) and transmits the video data to the interpolation unit 215. The interpolation unit 215 converts a 4:2:0 format of the transmitted data into a 4:2:2 format.

The video data interpolated by the interpolation unit 215 is transmitted to the LPF 217. The LPF 217 allows the image signal below a predetermined frequency to be passed and eliminates the image signal of a high frequency (the image signal that is above the predetermined frequency). Therefore, a noise element is removed by the LPF 217.

The video data that has passed through the LPF 217 is enlarged or scaled down by the scaler 219. The video data processed by the scaler 219 is transmitted to the RGB converter 221. The RGB converter 221 converts the transmitted video data to RGB data used in, for example, a monitor and a CRT. The RGB converted video data is transmitted to the overlay 209.

The overlay 209 receives the graphic data from the scaler 207 and the RGB converted video data from the RGB converter 221, and compounds two transmitted signals. The overlay 209 transmits the compounded signals to the first display 225 for displaying.

The controller 200 displays the image signal compounded by the overlay 209 on the first display 225, and at the same time, can retrieve the graphic data of the image signal to be displayed on the second display 247 from the main memory 201 with the DMA method through a separate route (bus F). In addition, the controller 200 can retrieve the video data of the image signal to be displayed on the second display 247 from the main memory 201 with the DMA method through a separate route (bus G). The operation for displaying the graphic data and the video data retrieved from the main memory 201 on the second display 247 after being processed is the same as the operation of displaying the graphic data and the video data on the first display 225. Thus, the description thereof will be omitted to avoid repetition.

The controller 200 receives the image signals processed respectively by the scalers 207, 219, 229, and 241, the interpolation units 215 and 237, the RGB converters 221 and 243, and the overlays 209 and 243, and stores the image signals into the secondary memory 203. The controller 200 uses the DMA method for storing the processed image signals into the secondary memory 203.

An image process unit, which processes signals with respect to the first display 225 and the second display 247, inputs and outputs the image signal to/from the main memory 201 and the secondary memory 203 through separate buses. Moreover, the buses are realized to be commonly used by the first display 225 and the second display 247.

Therefore, the second display 247 can simultaneously display an image signal which is the same image signal displayed on the first display 225. In addition, the image signal displayed on the first display 225, which is delayed for a predetermined time, can be displayed on the second display 247. The synchronous signal generator 249 synchronizes a time clock disposed in the first display 225 and the second display 247 in order to compensate for an offset of the image signal to be displayed on the first display 225 and the second display 247. Furthermore, the second display 247 can display the image signals different from each other among the image signals stored in the main memory 201 and commonly used with the first display 225.

Figure 4:
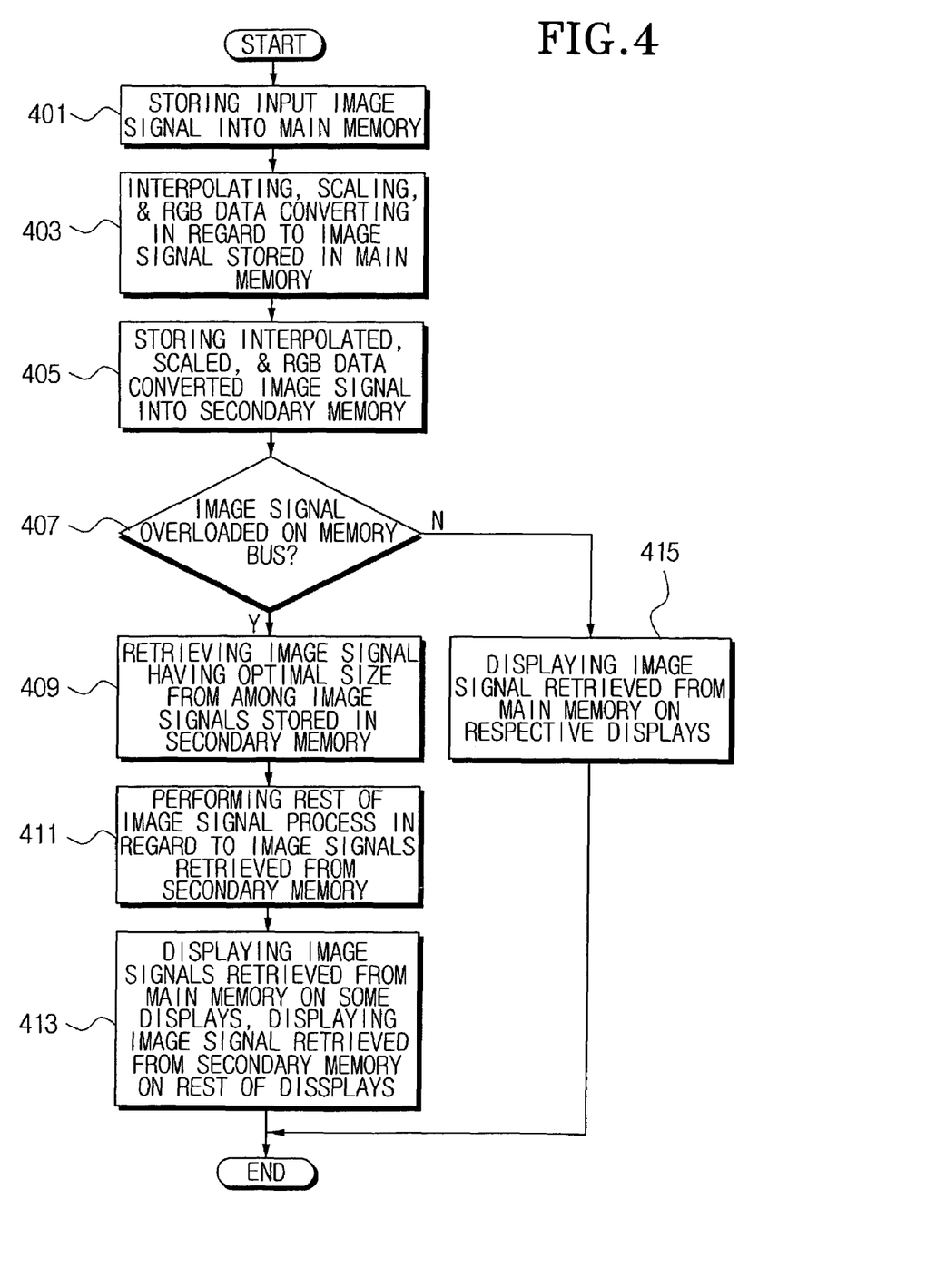
FIG. 4 is a flow chart illustrating a method of multi-displaying by using the multi-display system of FIG. 3.

FIG. 4 shows a flow chart illustrating a method of multi-displaying by using the multi-display system of FIG. 3. Hereinbelow, with reference to FIG. 3, the operation of the multi-display system 100 according to the present invention will be described.

As disclosed above, the scalers 207 and 229 of the image signal process units enlarge or scale down the graphic data among the image signals transmitted from the main memory 201 by the controller 200. The processed graphic data, enlarged or scaled down by the scaler 207, is transmitted to the overlay 209 by the scaler 207.

The interpolation units 215 and 237 of the image signal process units interpolate a standardization frequency ratio of the video data of the image signals transmitted from the main memory 201 by the controller 200 to have the 4:2:2 format converted from the 4:2:0 format. The video data interpolated by the interpolation units 215 and 237 is transmitted to the LPFs 217 and 239. The LPFs 217 and 239 pass the image signal that is below a predetermined frequency and eliminates the image signal of a high frequency. The video data that has passed the LPFs 217 and 239 is enlarged or scaled down by the scalers 219 and 241. The video data processed by the scalers 219 and 241 is transmitted to the RGB converters 221 and 243. The RGB converters 221 and 243 convert the transmitted video data into the RGB data used in the monitor and the CRT. The RGB converted video data is transmitted to the overlays 209 and 231. The overlays 209 and 231 receive the graphic data from the scalers 207 and 229, and the RGB converted video data from the RGB converters 221 and 243, and compound the received two signals.

The image signal input into the multi-display system 100 is stored into the main memory 201 in operation 401. Where the multi-display system 100 is set up to display the images simultaneously on a plurality of displays by a user, the controller 200 of the multi-display system 100 retrieves the stored image signal from the main memory 201 and transmits the image signal to the image signal process units.

The controller 200 receives the image signal respectively processed by the scalers 207, 219, 229, and 241, the interpolation units 215 and 237, the RGB converters 221 and 243, and the overlays 209 and 243, in operation 403, and stores the image signal into the secondary memory 203 in operation 405. A path (bus) for storing the image signal into the secondary memory 203 by the image signal process units is set up as a separate path that is different from the path of the image signal input into and output from the main memory 201.

The controller 200 determines whether the image signal input into and output from the main memory 201 is overloaded on the memory bus in operation 407. In response to a determination that the input/output image signal is overloaded on the memory bus, the controller 200 retrieves the processed image signal stored in the secondary memory 203. That is, the controller 200 retrieves an image signal having an optimal size, to solve the overload on the memory bus, among the image signals stored in the secondary memory 203 in operation 409.

The controller 200 processes to perform the rest of the processing operation to the image signals retrieved from the secondary memory 203 in operation 411. Where the processing operation of the image signals retrieved from the secondary memory 203 is completed, the controller 200 processes the image signal retrieved from the main memory 201 and displays the image signal on some of the displays, i.e., the display 225, and displays the processed image signal retrieved from the secondary memory 203 on the rest of the displays, i.e., the display 247 in operation 413. In response to a determination that the input/out image signal is not overloaded on the memory bus, in operation 407, the controller processes each of the image signals retrieved from the main memory 201, and displays the image signals on respective displays in operation 415.

To better understand the operations 401 to 415 described above, the following example is provided.

An image signal having a size, for example, of 1024 pixel×768 line is stored into the main memory 201 in operation 401. Moreover, during the operation 403, i.e., the interpolation, the scaling, the RGB data conversion, and the overlay of the image signal stored in the main memory 201, the controller 200 stores, for example, the image signal with 754 pixel×486 line, 800 pixel×525 line, and 640 pixel×480 line into the secondary memory 203 in operation 405.

In response to overloading of the image signal of 1024 pixel×768 line on the memory bus during the transmission from the main memory 201 to the first display 225 and the second display 247, in operation 407, the controller 200 retrieves the image signal having the optimal size, for a communication with the image signal of 1024 pixel×768 line, among the image signals having the size of 754 pixel×486 line, 800 pixel×525 line, and 640 pixel×480 line which are stored in the secondary memory 203 in operation 409. In this case, the image signal having the smallest size is usually retrieved. The controller 200 performs the rest of the image signal processing operation that has not been performed with respect to the image signals retrieved from the secondary memory 203 in operation 411.

For example, when the image signal of 800 pixel×525 line is retrieved from the secondary memory 203 and the retrieved image signal is the image signal stored in the secondary memory 203 after being scaled, the rest of the image signal processing operation, such as the RGB conversion and the overlaying, is performed on the 800 pixel× 525 line image signal.

When the rest of the image signal processing operation is completed, the controller 200 displays the image signal, which has been retrieved from the main memory 201 and processed, on the first display 225, and displays the image signal, which has been retrieved from the secondary memory 203 and processed, on the second display 247 in operation 413.

Although the image signals retrieved from the main memory 201 may be displayed simultaneously on more than two displays, where there is no overload of the image signal on the memory bus, the controller 200 separately processes each of the image signals retrieved from the main memory 201, and displays the image signals on each of the displays in operation 415.

Accordingly, the present invention solves the overloading problem of the image signal on the memory bus where the image signals are simultaneously displayed on a plurality of displays. Consequently, the present multi-display system has a greater processing capability.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A multi-display system, comprising:
   displays which display image signals;
   a main memory which stores the image signals input to the multi-display system;
   image signal process units which are disposed corresponding to each of the displays, and process the image signals into separate formats according to each of the corresponding displays;
   a memory bus which transmits the image signals to/from the main memory and the image signal process units;
   a secondary memory which stores the processed image signals processed by the image signal process units;
   a secondary memory bus separately provided from the memory bus which transmits processed image signals to/from the secondary memory and the image signal process units; and
   a controller which controls the image signal process units to display the image signals stored in the main memory rather than the secondary memory on each of the corresponding displays, wherein the controller controls the image signal process units to display the processed image signals stored in the secondary memory on some of the displays in response to overloading of the image signals on the memory bus where the image signals are displayed on at least two of the displays,
   wherein each of the image signal process units comprises;
   an interpolation unit which interpolates a standardization frequency ratio of video data of the image signals;
   a scaler which enlarges and scales down graphic data of the image signals and the video data that is interpolated;
   a RGB converter which converts the video data that is enlarged and scaled into RGB data; and
   an overlay which compounds the graphic data that is enlarged and scaled with the RGB data.

2. The multi-display system according to claim 1, wherein the controller stores the processed image signals, which are processed by the scaler, the interpolation unit, the RGB converter, and the overlay, into the secondary memory.

3. The multi-display system according to claim 2, wherein the controller controls to retrieve and display the processed image signals having an optimal size among the processed image signals stored in the secondary memory in response to the overloading of the image signals on the memory bus.

4. The multi-display system according to claim 3, wherein the controller controls to retrieve and transmit the processed image signals from the secondary memory to a corresponding one of the image signal process units, so as to further process the processed image signals retrieved from the second memory.

5. The multi-display system according to claim 2, wherein each of the image signal process units further comprises a low pass filter which filters the image signals input.

6. A method of multi-displaying, the method comprising:
   storing input image signals into a main memory through a memory bus;
   processing to convert the image signals stored in the main memory into processed image signals having separate formats corresponding to displays, respectively;
   storing the processed image signals into a secondary memory through a secondary memory bus; and
   displaying the processed image signals stored in the main memory rather than the secondary memory on each of the corresponding displays, and displaying the processed image signals stored in the secondary memory on some of the displays in response to overloading of the image signals on the memory bus, through which the image signals are retrieved from, where the image signals are displayed on at least two of the displays,
   wherein the processing of the image signals comprises:
   interpolating a standardization frequency ratio of video data of the image signals;
   enlarging and scaling down graphic data of the image signals and the video data that is interpolated;
   converting the video data that is enlarged and scaled into RGB data; and
   compounding the graphic data that is enlarged and scaled with the RGB data.

7. The method according to claim 6, wherein the processed image signals having an optimal size are retrieved among the processed image signals stored in the secondary memory and displayed in response to the overloading of the image signals on the memory bus.

8. The method according to claim 7, further comprising:
   retrieving the processed image signals stored in the secondary memory; and
   performing remaining image signal processing to the processed image signals retrieved from the second memory.

9. The method according to claim 8, wherein the performing of the remaining image signal processing comprises low pass filtering the processed image signals.

10. The method according to claim 6, further comprising low pass filtering the image signals prior to the displaying.

11. A computer readable medium encoded with processing instructions for implementing a method of multi-displaying performed by a computer, the method comprising:
   storing input image signals into a main memory through a memory bus;
   processing to convert the image signals stored in the main memory into processed image signals having separate formats corresponding to individual displays, respectively;
   storing the processed image signals into a secondary memory through a secondary memory bus; and
   displaying the processed image signals stored in the main memory rather than the secondary memory on each of the corresponding displays, and displaying the processed image signals stored in the secondary memory on some of the displays in response to overloading of the image signals on the memory bus, through which the image signals are retrieved from, where the image signals are displayed on at least two displays,
   wherein the processing of the image signals comprises:
      interpolating a standardization frequency ratio of video data of the image signals;
      enlarging and scaling down graphic data of the image signals and the video data that is interpolated;
      converting the video data that is enlarged and scaled into RGB data; and
      compounding the graphic data that is enlarged and scaled with the RGB data.

12. The computer readable medium according to claim 11, wherein the processed image signals having an optimal size are retrieved among the processed image signals stored in the secondary memory and displayed in response to the overloading of the image signals on the memory bus.

13. The computer readable medium according to claim 12, further comprising:
   retrieving the processed image signals stored in the secondary memory; and
   performing remaining image signal processing to the processed image signals retrieved from the second memory.

* * * * *

UNITED STATES PATENT AND TRADEMARK OFFICE
CERTIFICATE OF CORRECTION

| | |
|---|---|
| PATENT NO. | : 7,369,131 B2 |
| APPLICATION NO. | : 10/272016 |
| DATED | : May 6, 2008 |
| INVENTOR(S) | : Sung-kyu Choi |

It is certified that error appears in the above-identified patent and that said Letters Patent is hereby corrected as shown below:

Column 8, Line 3, change "comprises;" to --comprises:--.

Signed and Sealed this

Sixteenth Day of September, 2008

JON W. DUDAS
*Director of the United States Patent and Trademark Office*